US 6,529,125 B1

(12) United States Patent
Butler et al.

(10) Patent No.: US 6,529,125 B1
(45) Date of Patent: Mar. 4, 2003

(54) AUTOMOTIVE CONTROL PANEL

(75) Inventors: Bryan Frederick Butler, Billericay (GB); Stephen Anthony Nolan, Huntington Woods, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/856,088
(22) PCT Filed: Nov. 26, 1999
(86) PCT No.: PCT/GB99/03924
§ 371 (c)(1),
(2), (4) Date: Aug. 6, 2001
(87) PCT Pub. No.: WO00/34067
PCT Pub. Date: Jun. 15, 2000

(30) Foreign Application Priority Data

Dec. 4, 1998 (GB) .............................................. 9826705

(51) Int. Cl.[7] ................................................. B60Q 1/00
(52) U.S. Cl. ................ 340/461; 340/407.1; 340/815.47
(58) Field of Search ............................. 340/461, 407.1, 340/815.46, 815.45, 815.49, 815.47, 712, 706, 703, 438, 441, 463, 932.2; 395/161; 307/10.1

(56) References Cited

U.S. PATENT DOCUMENTS

| 4,121,204 A | | 10/1978 | Welch et al. ................ 340/337 |
| 5,404,443 A | * | 4/1995 | Hirata ........................ 395/161 |
| 5,539,429 A | * | 7/1996 | Yano et al. .................. 345/173 |
| 5,784,036 A | * | 7/1998 | Higuchi et al. ................. 345/7 |
| 5,945,646 A | | 8/1999 | Miller et al. ................ 200/5 R |
| 6,013,956 A | * | 1/2000 | Anderson, Jr. ............. 307/10.1 |
| 6,260,859 B1 | * | 7/2001 | Dixon et al. ............. 280/5.514 |

* cited by examiner

Primary Examiner—Jeffery Hofsass
Assistant Examiner—Son Tang
(74) Attorney, Agent, or Firm—Brinks Hofer Gilson & Lione

(57) ABSTRACT

The invention relates to a vehicle control panel for an automotive vehicle having at least one multifunctional setting switch and a mode selector for setting the control panel to operate in any one of at least two modes, wherein in a first mode of operation of the control panel the multifunctional setting switch controls a parameter of an audio system of the vehicle, and, in a second mode of operation of the control panel the multifunctional setting switch controls a parameter of a climate control of the vehicle.

13 Claims, 1 Drawing Sheet

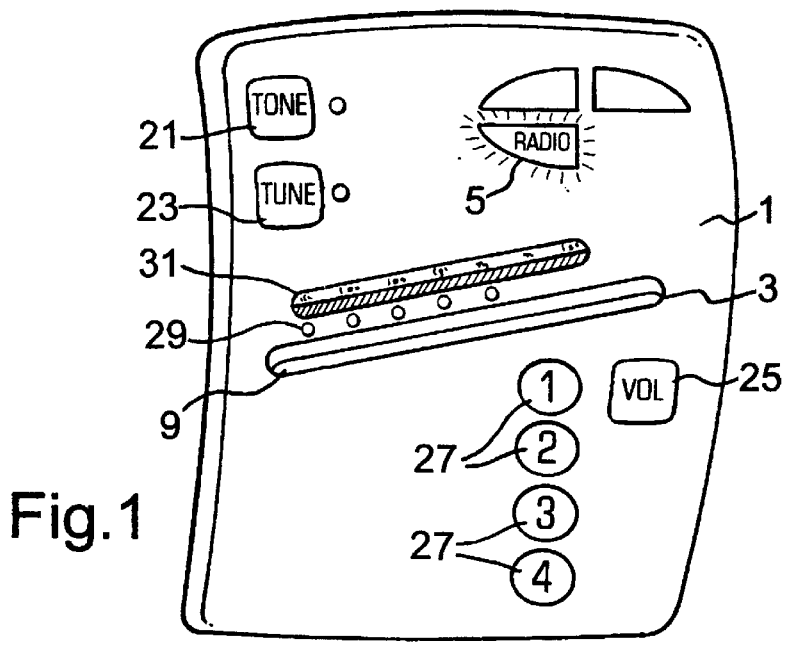
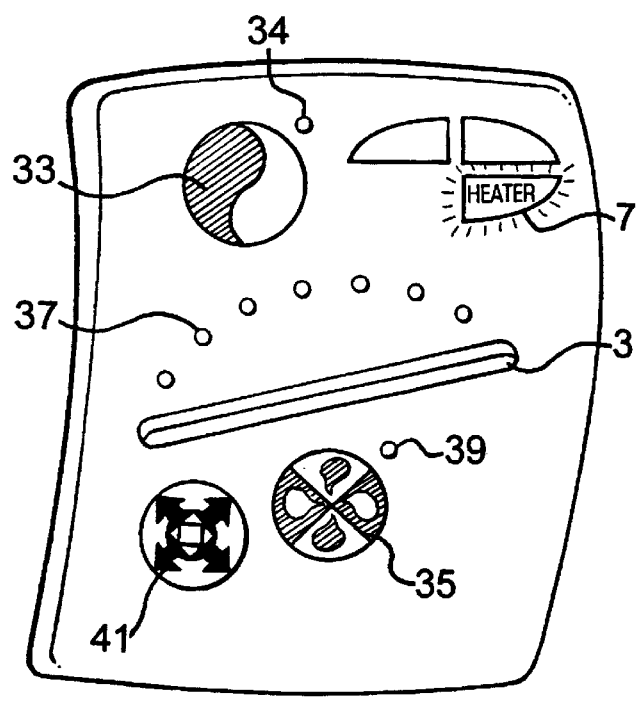
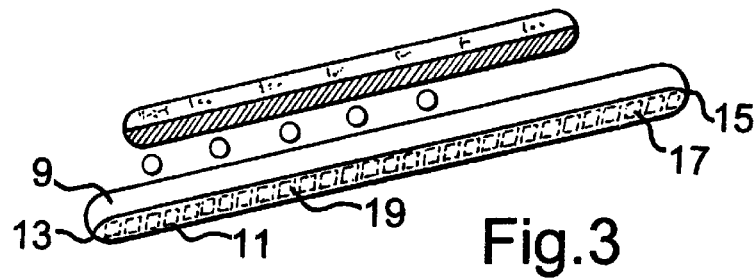

AUTOMOTIVE CONTROL PANEL

FIELD OF THE INVENTION

The invention relates to a vehicle control panel for an automotive vehicle having at least one multifunctional setting switch and a mode selector for setting the control panel to operate in any one of at least two modes, wherein in a first mode of operation of the control panel the multifunctional setting switch controls a parameter of an audio system of the vehicle, and, in a second mode of operation of the control panel the multifunctional setting switch controls a parameter of a climate control system of the vehicle.

On the instrument panel of most modern automobiles there are a plethora of dials, warning lights and switches, only a few of which are relevant to the driver at any one time. There are many switches for all the functions of the 'passenger comfort' systems, i.e. those which do not contribute to the safe driving of the vehicle such as the audio system and the climate control system. Care has to be taken by the designers of automotive instrument panels to avoid clutter. FR-2738196 and WO-98/09847 disclose control systems with multifunctional switches in which the function served by a switch at any one time is displayed using a display screen. However, the use of a display screen makes such control systems costly to implement. Furthermore, it is necessary for the driver to read what is on the screen to determine the function that is being controlled and this can be distracting to the driver.

The present invention seeks therefore to provide a simplified vehicle control panel using a multifunctional setting switch in which clutter is avoided.

SUMMARY OF THE INVENTION

According to the invention there is provided a vehicle control panel having at least one multifunctional setting switch and a mode selector for setting the control panel to operate in any one of at least two modes, wherein in a first mode of operation of the control panel the multifunctional setting switch controls a parameter of an audio system of the vehicle, and, in a second mode of operation or the control panel the multifunctional setting switch controls a parameter of a climate control system of the vehicle, characterised in that, in each mode of operation of the control panel, respective system-specific function selection buttons are displayed on the control panel, each enabling selection of a respective vehicle system parameter to be controlled by the multifunctional setting switch, the respective system-specific function selection buttons only being displayed when the control panel is operating in the appropriate mode, and in that on the control panel, none of the function selection buttons of one vehicle system overlaps the function selection buttons of any other vehicle system to be displayed in any one mode of operation of the control panel.

In the present invention, the appearance of the control panel changes significantly between operating modes so that the vehicle driver can tell at a glance which vehicle system is being controlled at any one time. Furthermore, the buttons that select the different functions controlled by the multifunctional manual switch in any one mode all occupy different positions on the control panel for thy different vehicle systems, so that the driver can quickly learn to associate a position on the control panel with a given function, thereby enabling function selection and control of the selected vehicle system parameter to be carried out with a minimum of distraction.

The climate control system parameters may be temperature or fan speed. The audio system parameters may be volume, tuned frequency or track number in a CD.

Preferably the automotive control panel additionally includes displays of the level of the parameters controlled.

More preferably such displays are also hidden until he control panel is operating in the mode in which that parameter is controllable by the multifunctional switch. In this way, the driver in only presented with information relevant to the vehicle system corresponding to the prevailing mode of operation of the control panel.

Preferably such selective display is provided by using a 'secret-until-lit' material which carries a first printed layer on its obverse surface and a record printed layer on its reverse surface, the second printed layer being visible only when backlit.

Such a 'secret-until-lit' material is disclosed in International Patent application WO97/16812 and comprises a partially transparent tinted substrate layer carrying a first obverse layer and a second reverse layer, the second reverse layer carrying a first printed display and the first obverse layer carrying a second printed display and being partially transparent coated with a transparent carrier supporting non opaque particulate light splitting or light frequency modulating materials such as mica coated with titanium dioxide. In ambient light the second printed display is visible and when a light of sufficient intensity is shone from a source located at the rear of the material the presence of the first printed display on the second reverse layer becomes visible and the second printed display becomes visible. A light emitting diode or sets of diodes can be used to provide the backlighting.

Thus, around the switch there may be arranged a series of graduations which are printed on the reverse layer, one set of graduations corresponding to each parameter that the switch is arranged to control, each set of graduations having located behind it a set of LED's which can be selectively illuminated dependent upon the mode in which the control panel is operating.

Preferably, the multifunctional manual switch is of the type described in no-pending international Patent Application WO00/34006, entitled Touch Sensitive Switch. Such a switch comprises a touch sensitive switch for use to select the level of a parameter of operation of an automotive system comprising a hollowed out depression in an instrument panel defining a guide track extending between a first wall and a second wall, shaped and sized to receive the tip of a finder and allow it to be freely moved along the base of the track from one wall to the other, the base of the guide track including touch sensitive means such that the position along the track to which the finger is moved selects the lever of the parameter.

The touch sensitive means may comprise a series of microswitches arranged along the length of the guide track so the position to which the finger is moved along the guide track selects a microswitch located at the end of the fingers path to select a particular level of the parameter. Alternatively the touch sensitive means may include a resistive strip with the resistance depending on the position to which the finger is moved.

Preferably the guide track is an elongate substantially linear track.

BRIEF DESCRIPTION OF THE DRAWINGS

The invention will now be described further, by way of example, with reference to the accompanying drawings, in which:

FIG. 1 is a schematic view of an automotive control panel in one mode;

FIG. 2 is a schematic view of the automotive control panel of FIG. 1, in a second mode; and, FIG. 3 is an enlarged perspective view of the switch.

DESCRIPTION OF THE PREFERRED EMBODIMENT

The drawings show an automotive control panel 1 which can operate in different modes to control either the audio system or the climate control system of the vehicle. The panel 1 is provided with at least one multifunctional switch 3, which can be used to control any one of several parameters or functions in each mode of operation of the control panel 1. The mode of operation of the control panel 1 is selected by pressing the appropriate one of two mode selector switches 5 and 7.

The switch 3 is a touch sensitive switch comprising a hollowed out depression 9 in the instrument panel 1 defining a guide track 11 extending between a first stop 13 and a second stop 15, shaped and sized to receive the tip of a finger and allow it to be freely moved along the base of the track 17 from one stop 13 to the other 15, the base of the guide track 17 including touch sensitive means 19 such that the position along the track to which the finger is moved selects the level of the parameter.

In addition to the mode selector buttons 5 and 7, the automotive control panel 1 includes a plurality of function selectors 21, 23, 25 which are depressed to select the function of the multifunctional switch. In the example illustrated in FIG. 1, the audio system consists of a radio, and when the control panel is selected to operate in this mode using the mode selector 5, the function of the switch 3 can be set by means of the function selectors 21, 23 and 25 to control the tone, the tuning frequency and the volume, respectively. When the control panel 1 is set to operate in its second mode by actuation of the mode selector 7, then the display changes to that shown in FIG. 2, whereupon the same multifunctional switch 3 may be used control such parameters as the temperature or the fan speed of the climate control unit.

The automotive control panel 1 comprises a series of LED's mounted behind a secret-until-lit material such as that sold by John McGavigan limited of Woodilee Road, Kirkintilloch, Glasgow G66 3UW add as described in their patent application WO 97/16812. Arranged behind the material are also a series of depressable switches for function selection.

When the key is inserted in the ignition of the vehicle, the driver can see both the panel mode control switches 5 and 7, designated 'RADIO' and 'HEATER' respectively. When switch 5 is depressed, it becomes illuminated and the word RADIO shines in red. At the same time the switch 7 is not highlighted.

This operation sets the control panel 1 in its first mode in which it is used to control the audio system with the result that a number of other switches and displays become visible as illustrated in FIG. 1. These include the TONE button 21, TUNE button 23, VOLUME button 25, and preset radio station buttons 27 designated '1' '3' '3' and '4'.

If TONE button 21 is depressed, operation of the multifunctional switch 3 varies the tone. The output of the switch 3 is thus connected to the tore variation of the radio. Operation of the switch 3 has two results—the tone of the radio is changed and a display 29 is selectively illuminated.

The display comprises a series of markers, here spaced apart circles arranged along the edge of depression 9. As the finger of the driver moves to change the level of the tone more lights are illuminated.

If TUNE button 23 is depressed, actuation of the multifunctional switch 3 varies the tuned frequency of the radio, i.e. it changes radio stations. The output of the switch 3 is thus connected to the frequency selector of the radio.

Selection of TUNE button 23 also illuminates turning display 31 which appears similar to a standard radio station display where the different frequencies are marked as graduations and a pointer moves up the graduations to illustrate the selected frequency.

Tuning display 31 is backlit only when TUNE button 23 has been operated so that once the correct tuning has taken place the driver need not be distracted farther by the display.

An alternative method of selection of a predetermined station uses buttons 27 which can be used to select one of four preselected radio stations.

When VOLUME button 25 is depressed, operation of the switch 3 sets the volume or loudness of the radio output. Operation of the switch 3 again selectively illuminates the lights of display 29—here the volume level is depicted by the number of markers illuminated along the length of the switch 3.

If the control panel 1 is set to operate in climate control mode by actuation of the mode selection button 7, the LEDS positioned behind buttons 21, 23, 25 and 27 and the displays 29 and 31 are all switched off and they become invisible. Instead, the button 7 is illuminated by a red light and the control panel takes on the appearance shown in FIG. 2, in which further functions selector buttons, such as buttons 33 and 35, become illuminated.

In this mode of operation of the control panel, depression of the TEMPERATURE function button 33 causes an adjacent light 34 to be illuminated and connects the output of the multifunctional switch 3 to the temperature control of the climate control system. Manual actuation of the switch 3 causes the temperature setting to be varied and causes selective illumination of markers (here circles arranged in an arc running along the edge of switch 3) of display 37. Once again the number of circles illuminated corresponds with the temperature level set by the switch 3.

Depression of function button 35 causes the output of the switch 3 to set the fan speed. Selection of this button illuminates adjacent light 39 and operation of switch 3 causes selective illumination of display 37, in this case depicting the fan speed selected.

The direction is which the heat is directed is controlled by button 41 which illustrates four arrows which can be depressed to select desired heat source.

As can be seen from FIGS. 1 and 2, in the preferred embodiment of the invention no two system-specific control buttons nor any two displays of the audio and climate control modes operation of the control panel overlap one another. Only the position on the control panel 1 of the multifunctional switch 3 itself is common to the various parameters that can be controlled by the switch 3 in the different operating modes of the control panel 1. For this reason, it is possible to selectively backlight the respective displays so that only those relevant to the audio system are illuminated when parameters of the audio system are being changed, and only those displays relevant to the climate control system are illuminated when its parameters are being selected. At all other times those displays become invisible to the driver.

It will be apparent to the skilled addressee of the specification that many other functions of the audio and climate control system may be operated by the switch 3, and that its use is not limited to operation of those functions. For example the switch could be used for altering seat or mirror positions. Also many other forms of display can be used.

The structure of the switch itself is depicted in FIG. 3 where it can be seen that an elongate depression 9 in the instrument panel is in the form of a wide groove which is elongate and substantially linear. The groove is 16 mm wide and 3 mm deep—this is wide enough to allow the fattest finger to be slid along the groove and is deep enough to give the user a positive feel that his finger is correctly located without having to study the instrument panel carefully.

This is arranged on the instrument panel at a slight angle to the horizontal to form a guide track 11 which runs from left to right and upwards which gives the driver the impression of selecting a higher level of the parameter as his finger moves from left to right.

The end walls 13 and 15 of guide track 11 define steps which provide a definite feel for the driver as he operates the switch. Along the base 17 of the guide track are arranged a series of microswitches 19 (shown in dotted line)—as a finger is run along the guide track, the microswitches are serially activated to select the level of the particular parameter being controlled at that time.

What is claimed is:

1. A vehicle control panel comprising:
    a mode selector, which may be enabled to activate any one of at least two modes of operation;
    system-specific buttons, which do not overlap one another on said vehicle control panel and are only capable of being displayed upon the activation of an appropriate mode of operation, wherein said system-specific buttons enable selection of a respective vehicle system parameter of a vehicle system to be controlled; and
    at least one multifunctional setting switch, which is capable of controlling the vehicle system parameters.

2. An automotive control panel as claimed in claim 1, wherein said at least two modes of operation include the use of an audio system and a climate control system.

3. A control panel as claimed in claim 1, further including a level display to display the level of the parameter being controlled by said multifunctional setting switch.

4. A control panel as claimed in claim 3, wherein said level display is hidden until the activation of an appropriate mode of operation in which that parameter is controllable by said multifunctional setting switch.

5. A control panel as claimed in claim 1, incorporating a 'secret-until-lit' material, which carries a first printed layer on its obverse surface and a second printed layer on its reverse surface, the second layer being visible only when backlit.

6. A control panel as claimed in claim 1, wherein said multifunctional setting switch comprises a depression defining a guide track shaped and sized to receive the tip of a finger and to allow the finger to be freely moved along the track, said guide track including a touch sensitive device adapted to allow selection of a parameter level.

7. A control panel as claimed in claim 6, wherein said touch sensitive device includes a series of microswitches arranged along the length of said guide track such that the position along said guide track to which the finger is moved selects a particular microswitch to select a particular level of the parameter.

8. A control panel as claimed in claim 7, wherein said guide track is an elongated substantially linear track.

9. A control panel as claimed in claim 6, wherein said touch sensitive device includes a resistive strip with the resistance depending on the position to which the finger is moved.

10. A control panel as claimed in claim 9, wherein said guide track is an elongated substantially linear track.

11. A control panel for a vehicle comprising:
    a mode selector adapted to allow an occupant of the vehicle to select a mode associated with the vehicle;
    mode-specific buttons located at distinct and non-overlapping positions on the control panel and capable of being displayed upon selection of a corresponding mode by the occupant, wherein said mode-specific buttons allow the occupant to select a parameter associated with the selected mode; and
    at least one multifunctional setting switch adapted to allow the occupant to control a level associated with the selected parameter.

12. A control panel for a vehicle as claimed in claim 11, wherein said multifunctional setting switch comprises a depression shaped and sized to receive the tip of a finger and to allow the finger to be freely moved along the depression.

13. A control panel for a vehicle as claimed in claim 12, wherein said depression comprises a first end, a second end, and a middle portion.

* * * * *